(12) United States Patent
Alspach et al.

(10) Patent No.: US 11,585,715 B2
(45) Date of Patent: Feb. 21, 2023

(54) CALIBRATION DEVICE AND CALIBRATION PROCEDURE FOR FLUID FILLED SENSOR

(71) Applicant: TOYOTA RESEARCH INSTITUTE, INC., Los Altos, CA (US)

(72) Inventors: Alexander Alspach, Somerville, MA (US); Naveen Suresh Kuppuswamy, Arlington, MA (US); Avinash Uttamchandani, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 318 days.

(21) Appl. No.: 16/836,507

(22) Filed: Mar. 31, 2020

(65) Prior Publication Data

US 2021/0302255 A1 Sep. 30, 2021

(51) Int. Cl.
   *G01L 25/00* (2006.01)
   *B25J 13/08* (2006.01)
   *G01S 17/08* (2006.01)

(52) U.S. Cl.
   CPC ............ *G01L 25/00* (2013.01); *B25J 13/084* (2013.01); *G01S 17/08* (2013.01)

(58) Field of Classification Search
   CPC ......... G01L 25/00; B25J 13/084; G01S 17/08
   See application file for complete search history.

(56) References Cited

U.S. PATENT DOCUMENTS

| 9,880,066 | B2 | 1/2018 | Larsen et al. |
| 10,228,318 | B1 | 3/2019 | Boyer et al. |
| 2007/0156066 | A1 | 7/2007 | McGinley et al. |
| 2012/0307590 | A1 | 12/2012 | Faruque |
| 2013/0234977 | A1* | 9/2013 | Lin ................. G06F 3/0446 345/174 |
| 2019/0107378 | A1* | 4/2019 | Meile ............... G01B 21/045 |
| 2019/0234726 | A1 | 8/2019 | Gifford et al. |
| 2021/0154791 | A1* | 5/2021 | Kojima ............ B23Q 17/2233 |
| 2021/0294479 | A1* | 9/2021 | Moscovich ......... G06F 3/045 |

FOREIGN PATENT DOCUMENTS

| DE | 112010000828 T5 | 4/2013 |
| JP | 4163005 B2 | 10/2008 |
| KR | 20170077877 A | 7/2017 |
| WO | 1994023605 A1 | 10/1994 |
| WO | 2000003210 A1 | 1/2000 |

OTHER PUBLICATIONS

Multiscale stress-strain characterization of onion outer epidermal tissue in wet and dry states (https://www.researchgate.net/figure/Force-sensor-calibration-A-The-force-sensor-was-calibrated-using-a-precision-palance_fig2_270965335). Jan. 2015.

* cited by examiner

*Primary Examiner* — Jamel E Williams
(74) *Attorney, Agent, or Firm* — Dinsmore & Shohl LLP (57) ABSTRACT

Devices, systems and methods for calibrating a deformable sensor are disclosed herein. A calibration device for calibrating a deformable sensor includes a frame, at least one actuator supported by the frame, where the at least one actuator comprises a drive mechanism operatively coupled to a probe portion, and an electronic control unit communicatively coupled to the drive mechanism of the at least one actuator. The electronic control unit is configured to cause the drive mechanism to move the probe portion a predetermined position to form a predetermined contact surface defined by an end of the probe portion of the actuator.

19 Claims, 8 Drawing Sheets

CALIBRATION DEVICE AND CALIBRATION PROCEDURE FOR FLUID FILLED SENSOR

TECHNICAL FIELD

The present specification generally relates to calibration devices, systems, and methods for calibrating a deformable sensor. More specifically, the present concept relates to calibration devices, systems, and methods that utilize controllable actuators to form a predetermined contact surface to contact the deformable sensor with and calibrate the deformable sensor.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors. From time to time, the contact sensors require calibration. Currently calibration processes include contacting the known object to the contact sensor by hand. Accordingly, there is a need to automate the calibration process contact sensors such as deformable sensors.

SUMMARY

In one embodiment, a calibration device for calibrating a deformable sensor includes a frame, at least one actuator supported by the frame, where the at least one actuator comprises a drive mechanism operatively coupled to a probe portion, and an electronic control unit communicatively coupled to the drive mechanism of the at least one actuator. The electronic control unit is configured to cause the drive mechanism to move the probe portion a predetermined position to form a predetermined contact surface defined by an end of the probe portion of the actuator.

In some embodiments, a system for calibrating a deformable sensor with a calibration device includes a deformable sensor comprising a deformable membrane configured to deform when in contact with an object and an internal sensor configured to output depth values for a region of the deformable membrane defining a deformation of the deformable membrane caused by contact with the object, a calibration device comprising a frame and at least one actuator comprising a drive mechanism operatively coupled to a probe portion, and an electronic control unit communicatively coupled to the deformable sensor and the drive mechanism of the at least one actuator. The electronic control unit is configured to cause the drive mechanism to move the probe portion of at least one actuator to a predetermined position to form a predetermined contact surface defined by an end of the probe portion of the at least one actuator, receive depth values from the internal sensor of the deformable sensor, where the depth values define a sensed contour of a surface of the deformable membrane in contact with the predetermined contact surface defined by the calibration device, compare the sensed contour of the surface of the deformable membrane and the predetermined contact surface, and calibrate the deformable sensor based on differences determined from the comparison of the sensed contour of the surface of the deformable membrane and the predetermined contact surface.

In some embodiments, a method of calibrating a deformable sensor with a calibration device, includes positioning an array of actuators of the calibration device adjacent to a deformable membrane of the deformable sensor, causing selected actuators of the array of actuators to move to corresponding probe portions to a predetermined position where ends of the probe portions of the array of actuators define a predetermined contact surface and displace the deformable membrane according to the predetermined contact surface, detecting, with the deformable sensor, a geometry of the deformable membrane of the deformable sensor in response to contact with the predetermined contact surface of the calibration device, comparing, with an electronic control unit, the detected geometry and the predetermined contact surface, and calibrating the deformable sensor based on the comparison of the detected geometry and the predetermined contact surface.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our sense of touch allows us to determine the shape of an object without looking at the object. Furthermore, sense of touch provides information as to how to properly grasp and hold an object. Human fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects.

Embodiments of the present disclosure are directed to deformable/compliant contact and/or geometry sensors (hereinafter "deformable sensors") that not only detect contact with a target object, but also detect the geometry, pose and contact force of the target object. The deformable sensors described herein comprise a deformable membrane coupled to a housing that maintains a sensor capable of detecting displacement of the deformable membrane by contact with an object. The deformable sensors described herein not only detect the pressure or force that is applied to the deformable membrane, but can also detect the geometry and pose of the object. Thus, the deformable sensors described herein provide a robot (or other device) with a sense of touch when manipulating objects.

Deformability may refer, for example, to ease of deformation of deformable sensors. Spatial resolution may refer, for example, to how many pixels a deformable sensor has. The number of pixels may range from 1 (e.g., a sensor that simply detects contact with a target object) to thousands or millions (e.g., the dense sensor provided by a time-of-flight sensor having thousands of pixels) or any suitable number. Deformability may refer to how easily a deformable membrane deforms when contacting a target object. A deformable sensor may be of a high spatial resolution, with a dense tactile sensing sensor that is provided as an end effector of a robot, thereby giving the robot a fine sense of touch like a human's fingers. A deformable sensor may also have a depth resolution to measure movement toward and away from the sensor.

However, from time to time a deformable sensor may need to be calibrated or recalibrated. For example, a deformable membrane may include a defect, become damaged through use, succumb to wear and tear or the like which may change the behavior and/or geometry of the deformable membrane. Additionally an internal sensor which may be configured to determine the geometry of a deformable membrane in response to contact with an object. As a result, the deformable membrane may respond differently to the same object when new or initially calibrated as compared to a later time after use. To account for the changes, the internal sensor and/or other parameters of the deformable sensor may require calibration.

Embodiments of the present disclosure include devices, systems, and methods that can generate predetermined contact surfaces using one or more actuators places in contact with the deformable membrane so that calibration may be performed using a comparison between geometry captured by the internal sensor and the predetermined contact surfaces generated by the calibration device. Embodiments of the calibration device will be described in more detail herein. The following will now describe these devices, systems, and methods in more detail with reference to the drawings and where like numbers refer to like structures.

Figure 1:
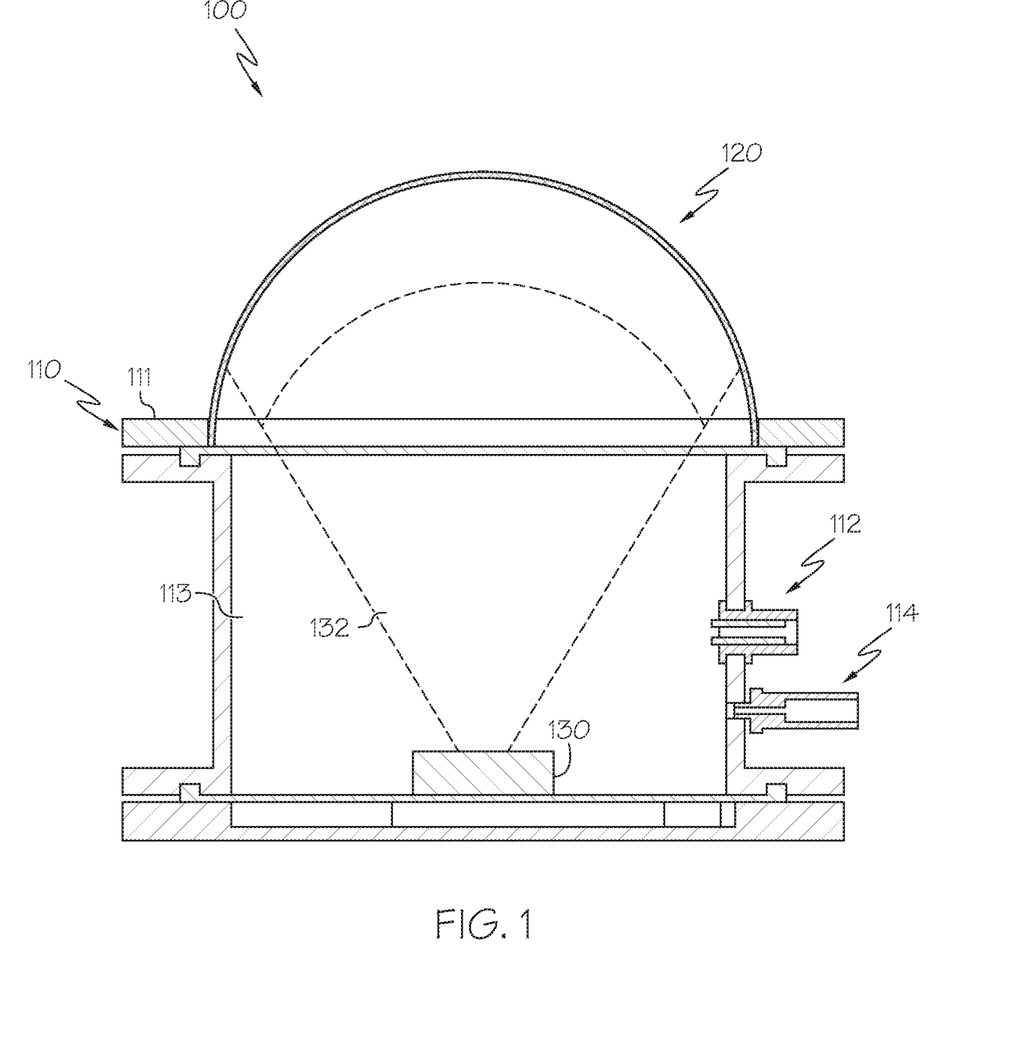
FIG. 1 schematically depicts a cross-section view of an example deformable sensor, according to one or more embodiments described and illustrated herein.
Figure 2:
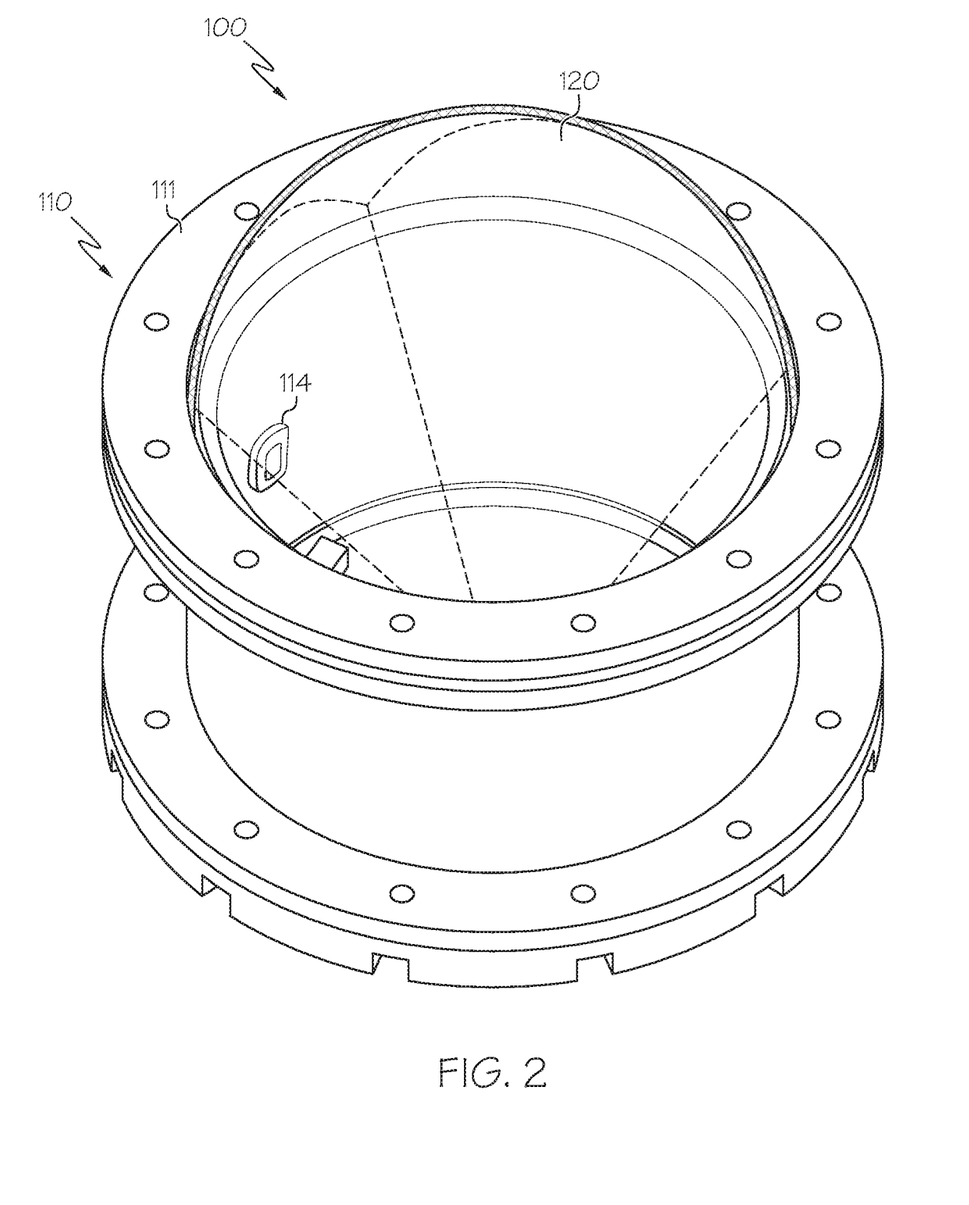
FIG. 2 schematically depicts a top perspective view of the example deformable sensor depicted by FIG. 1, according to one or more embodiments described and illustrated herein.

Referring now to FIGS. 1 and 2, an example deformable sensor 100 is schematically illustrated. FIG. 1 is a front elevation view of the example deformable sensor 100 and FIG. 2 is a top perspective view of the example deformable sensor 100. FIGS. 1 and 2 depict differing embodiments. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. In another example, the medium is a gel, such as silicone or other rubber-like substance. In some embodiments a substance such as solid silicone may be cast in a given shape before assembly of the deformable sensor 100. In various embodiments, the medium may be anything that is transparent to an internal sensor (discussed in more detail below), such as to a wavelength of a time of flight sensor. The medium may include clear/transparent rubbers in some embodiments. In other embodiments the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100. In some embodiments robots feature varying touch sensitivity due to varying spatial resolution and/or depth resolution.

Figure 3:
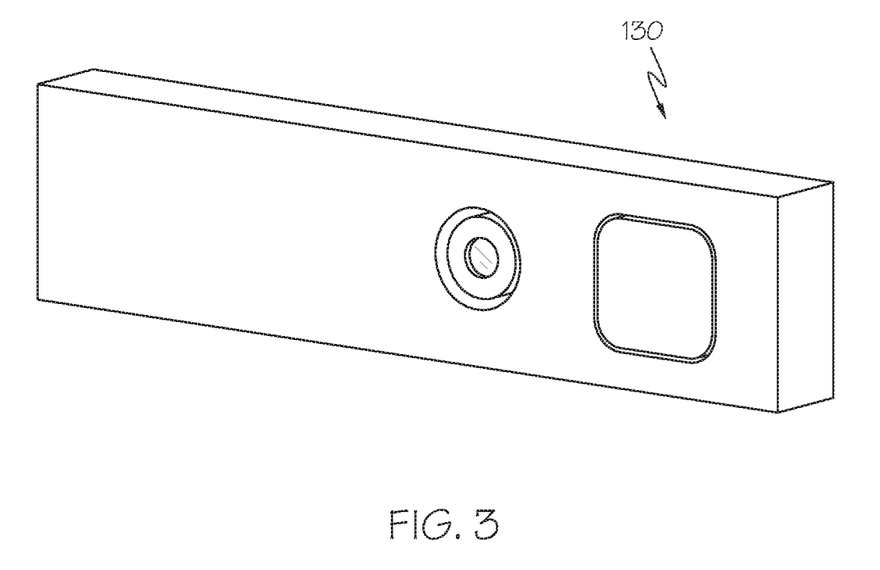
FIG. 3 schematically depicts an example time-of-flight sensor for use in a deformable sensor, according to one or more embodiments described and illustrated herein.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. In some embodiments the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 130 may be changed. In some cases, low spatial resolution (e.g., one "pixel" that detects a single point's displacement) may be desired. In others, a sensitive time-of-flight sensor such may be used as a high spatial resolution internal sensor 130 that provides dense tactile sensing. Thus, the internal sensor 130 may be modular because the sensors may be changed depending on the application. FIG. 3 depicts an example time-of-flight sensor. A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3d scanners, single cameras (such as with dots or other patterns inside), or any other suitable type of visual detector. For example, the internal sensor 130 may be configured as a stereo-camera capable of detecting deflections of the deformable membrane 120 by an object.

Any suitable quantity and/or types of internal sensors 130 may be utilized within a single deformable sensor 100 in some embodiments. In some examples, not all internal sensors 130 within a deformable sensor 100 need be of the same type. In various embodiments, one deformable sensor 100 may utilize a single internal sensor 130 with a high spatial resolution, whereas another deformable sensor 100 may use a plurality of internal sensors 130 that each have a low spatial resolution. In some embodiments the spatial resolution of a deformable sensor 100 may be increased due to an increase in the quantity of internal sensors 130. In some examples, a decrease in the number of internal sensors 130 within a deformable sensor 100 can be compensated for by a corresponding increase in the spatial resolution of at least some of the remaining internal sensors 130. As discussed in more detail below, the aggregate deformation resolution may be measured as a function of the deformation resolution or depth resolution among the deformable sensors 100 in a portion of a robot. In some embodiments aggregate deformation resolution may be based upon a quantity of deformable sensors in a portion of the robot and a deformation resolution obtained from each deformable sensor 100 in that portion.

Referring again to FIG. 1, a conduit 114 may be utilized in the enclosure 113 to provide power and/or data/signals, such as to the internal sensor 130 by way of a conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments utilized wireless internal sensors 130 to transmit and/or receive data and/or power. In various embodiments where the medium is not a gas, such as silicone, the enclosure 113 and/or conduit 114 may not necessarily be airtight.

In some embodiments the internal sensor 130 may include one or more internal pressure sensors (barometers, pressure sensors, etc., or any combination thereof) utilized to detect the general deformation of the deformable membrane 120 through the medium. In some embodiments the deformable sensor 100 and/or internal sensor 130 may receive/send various data, such as through the conduit 114 discussed above, wireless data transmission (wi-fi, Bluetooth, etc.), or any other suitable data communication protocol. For example, pressure within a deformable sensor 100 may be specified by a pressurization parameter and may be inversely proportional to the deformability of the deformable sensor 100. In some embodiments the deformability of a deformable sensor 100 may be modified by changing pressure within the enclosure 113 or a material of the deformable membrane 120. In some embodiments receipt of an updated parameter value may result in a real-time or delayed update (pressurization, etc.).

Figure 4A:
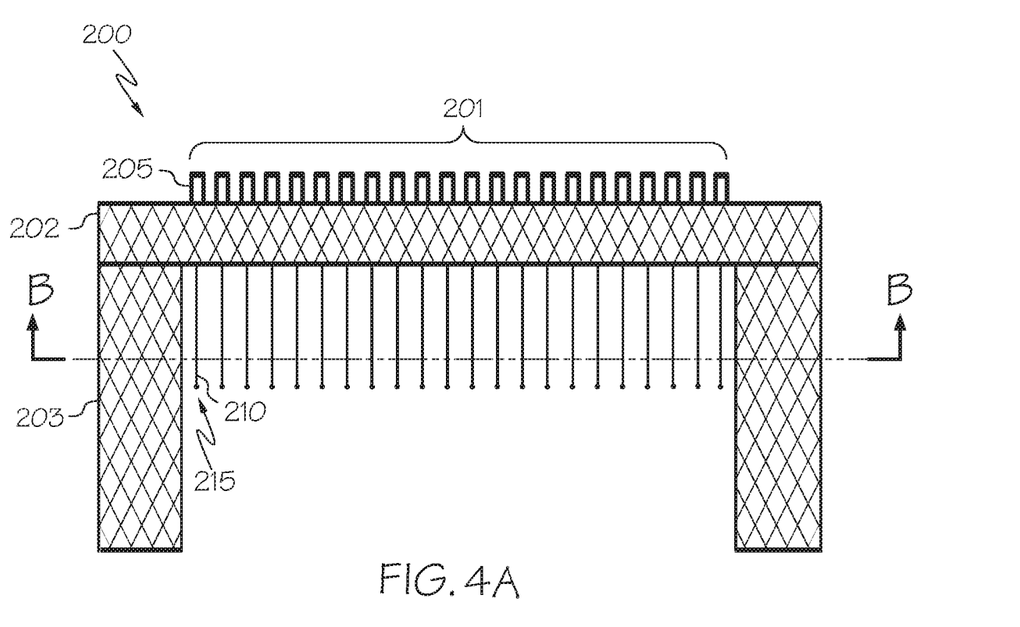
FIG. 4A schematically depicts an cross-section view of an example calibration device, according to one or more embodiments described and illustrated herein.
Figure 4B:
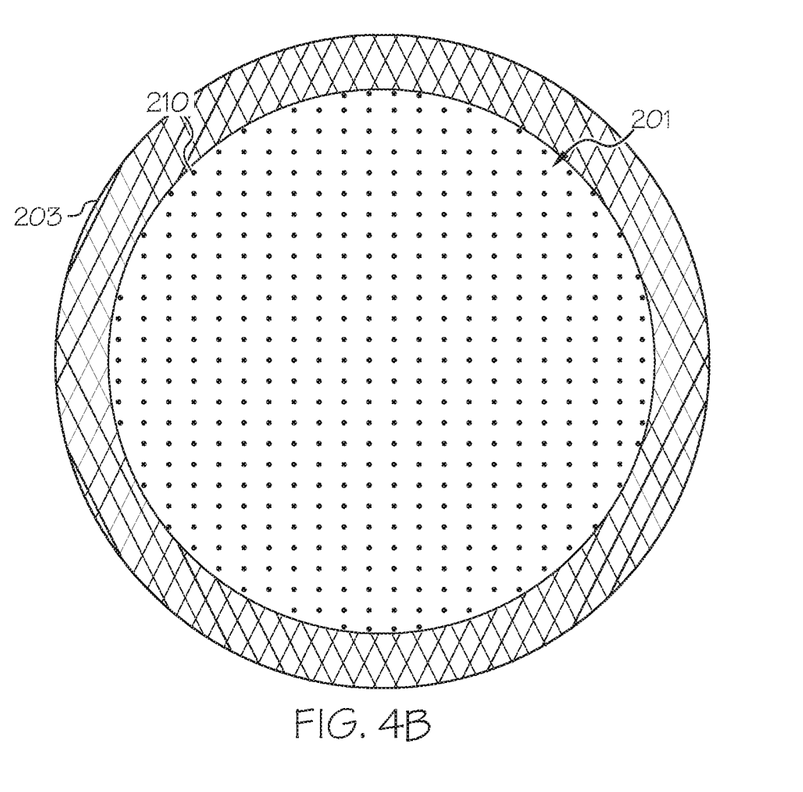
FIG. 4B schematically depicts a top-down cross-section view of the example calibration device depicted in FIG. 4A, according to one or more embodiments described and illustrated herein.

FIGS. 4A and 4B depict an illustrative schematics of a calibration device 200 for calibrating the deformable sensor 100. Embodiments of the calibration device 200 generally include an array of actuators 201 mounted in a frame 202. The frame 202 may further include locating features 203, which may be utilized to align the calibration device 200 with the deformable sensor 100. The actuators 201 include a drive mechanism 205 and a probe portion 210. The probe portion 210 is operatively coupled on one end to the drive mechanism 205 and an opposing end of the probe portion includes an end 215 for contacting the deformable membrane 120. The end 215 may include a ball nose, a blunt end, a tapered end, a flared end, or the like.

Figure 7:
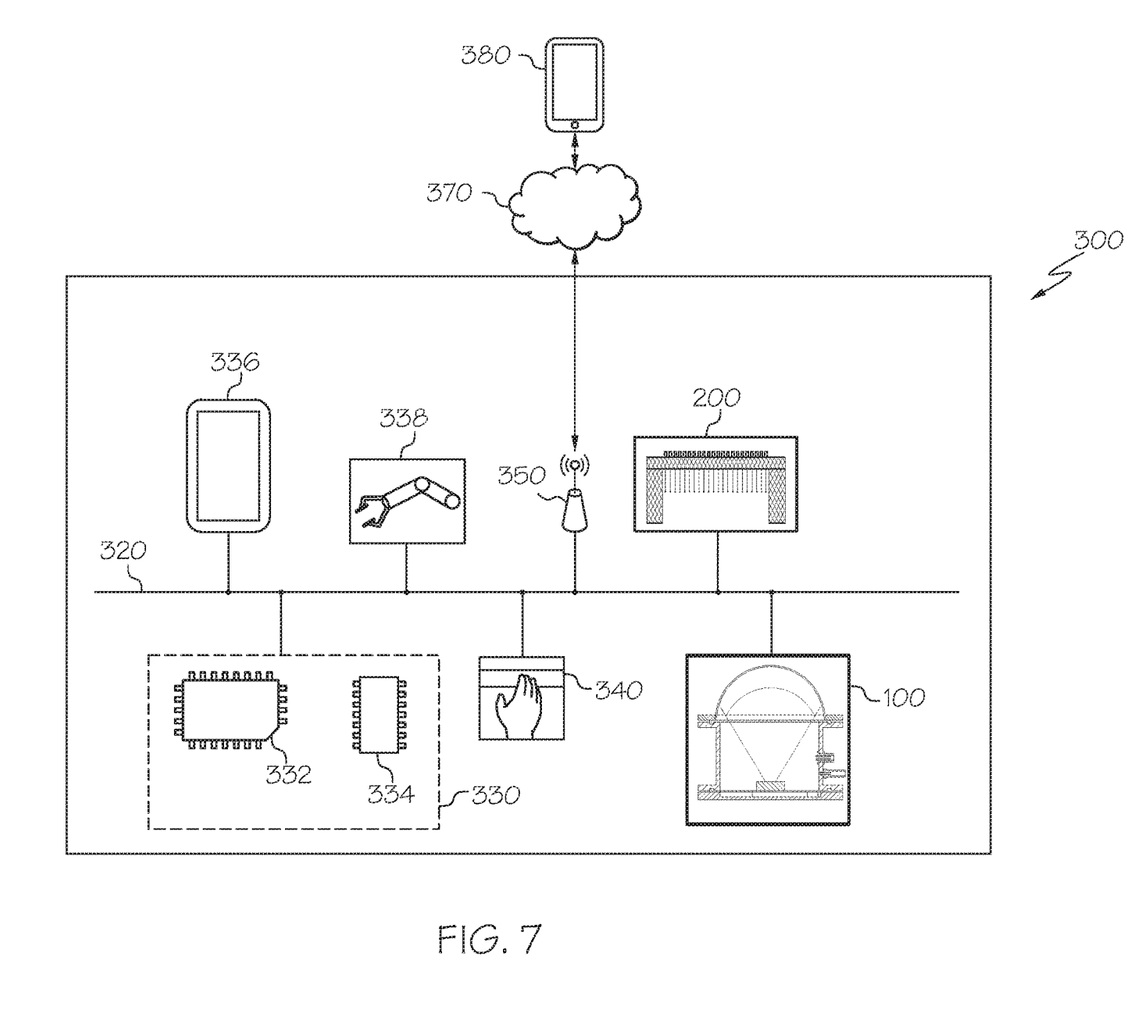
FIG. 7 a block diagram illustrating hardware utilized in the system for calibrating the deformable sensor, according one or more embodiments described and illustrated herein.

In embodiments, the drive mechanism 205 is structurally supported by the frame 202 of the calibration device 200 and communicatively coupled to an electronic control unit 330 (FIG. 7). The electronic control unit 330 will be described in more detail herein. In general, the electronic control unit 330 is configured to control the position of the probe portion 210. By adjusting the position of one or more probe portions 210, a predetermined contact surface defined by the ends 215 of the probe portions 210. The predetermined contact surface may simulate a surface contour of an object that contacts the deformable sensor 100. That is, the calibration device 200 is capable of generating multiple various predetermined contact surfaces that mirror or at least simulate a real object. This capability enables the calibration device 200 to perform calibration operations of the deformable sensor 100 using one or more predetermined contact surfaces generated by positioning the probe positions 210 of the actuators 201.

The actuators 201 may be any component having a drive mechanism 205 operatively coupled to a probe portion 210. The drive mechanism 205, in general, extends or retracts the probe portion 210. The actuators 201 may be an electromechanical device controlled with an electrical signal. For example, the drive mechanism 205 may include a motor that mechanically adjusts the position of the probe portion 210. In some embodiments, the actuators 201 may be a pneumatic type device, a hydraulic type device, or the like.

Referring to FIG. 4B, another cross-section view of the calibration device 200 is depicted. As depicted, the calibration device 200 includes at least one actuator 201, optionally an array of actuators 201. The array of actuators 201 may be arranged in a circular field, a square field, or any other closed shape.

Figure 5:
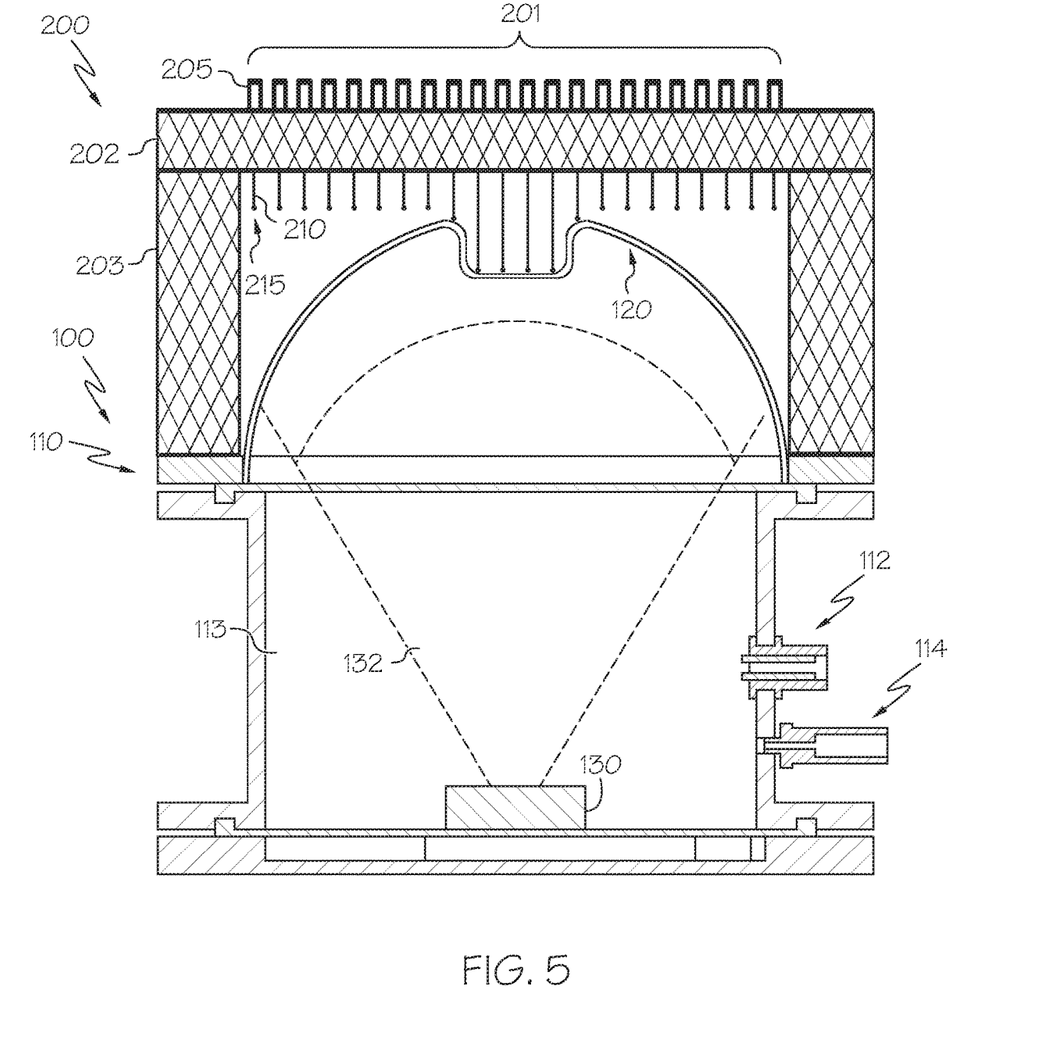
FIG. 5 schematically depicts a cross-section view of the example deformable sensor of FIG. 1 aligned with and being calibrated by the calibration device of FIG. 4A, according to one or more embodiments described and illustrated herein.

Referring to FIG. 5, the calibration device 200 engaged with the deformable sensor 100 during a calibration process is depicted. From time to time, calibration of the deformable sensor 100 may be performed. Calibration may be executed using a calibration device 200 that generates a predetermined contact surface. The predetermined contact surface may be a 3-dimensional contour that mimics or simulates an object contacting the deformable membrane 120 of the deformable sensor 100.

The calibration device 200 is positioned adjacent the deformable sensor 100 such that the ends 215 of the probe portions 210 of the actuators 201 when extended may contact the deformable membrane 120 of the deformable sensor 100 and deform the deformable membrane 120. In some embodiments, positioning the calibration device 200 with the deformable sensor 100 may be aided by locating features 203 that align with the housing 110 of the deformable sensor 100. The locating features 203 may include tongue and groove alignment features or some other features that are capable of aligning the frame and the array of the actuators 201 of the calibration device 200 with the deformable membrane 120 of the deformable sensor 100.

For example, in some embodiments, the deformable sensor 100 may be coupled to a robot arm. The robot arm upon activation may be controllably manipulated to align and fit the deformable sensor 100 with the calibration device 200 so that a calibration operation may be performed on the deformable sensor 100. The calibration operation may include generating one or more predetermined contact surfaces by causing the probe portions 210 of the calibration device to extend or retract. The predetermined contact surface illustrated in FIG. 5 is a cross-section of square object such as a cube being contacted with the deformable membrane 120. The predetermined contact surface configured by the calibration device 200 may be generated based on probe positions stored in the electronic control unit 330. The electronic control unit 330 may be configured to know or sense the current position of the actuators 201. By knowing or sensing the current position of the actuators 201, the electronic control unit 330 may generate one or more control signals that cause the drive mechanism 205 to move the probe portion 210 to a predetermined position.

Figure 6:
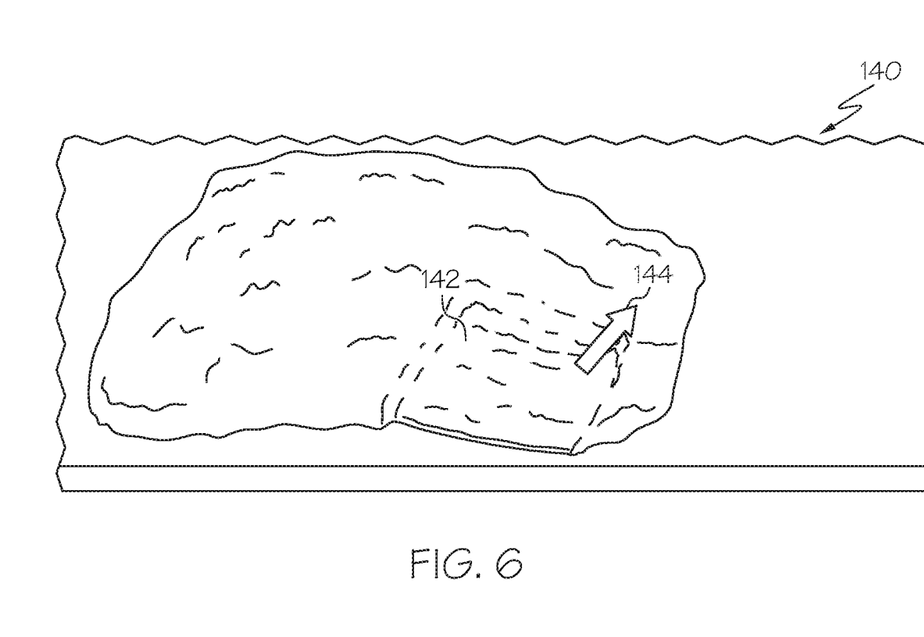
FIG. 6 is an image depicting an output of a deformable sensor on an electronic display, according to one or more embodiments described and illustrated herein.

In FIG. 5, several of the probe portions are retracted and some are extended to various positions to generate the predetermined contact surface of a cube. It should be understood that a cube is merely used as an example herein. In some embodiments, a contact surface of other objects and/or shapes may be generated by the array of actuators 201. Turning to FIG. 6, an image, for example, captured by the internal sensor 130 of the deformable sensor 100, of the predetermined contact surface displacing the deformable membrane 120 of the example deformable sensor 100 is depicted. In the illustrated embodiment, a display device 140 outputs for display on a device, output of the deformable sensor 100 in real time as the predetermined contact surface contacts and/or deforms the deformable membrane 120. It should be understood that the display device 140 is provided for illustrative purposes only, and that embodiments may be utilized without a display device. As the predetermined contact surface of the calibration device 200 is pressed into the deformable membrane 120, the predetermined contact surface imparts its shape into the deformable membrane 120 such that the deformable membrane 120 conforms to the contour of the predetermined contact surface. The spatial resolution of the internal sensor 130 may be such that the internal sensor 130 detects the geometry and/or pose of the displaced deformable membrane 120. For example, when the internal sensor 130 is a time-of-flight sensor, the optical signal that is reflected off of the bottom surface of the deformable membrane 120 that is being deflected by the predetermined contact surface has a shorter time-of-flight than the optical signal that is reflected by the deformable membrane 120 at a region outside of the deflected region. Thus, a contact region 142 (or sensed contour, used herein interchangeably) having a geometry and/or pose matching the shape of the predetermined contact surface may be outputted and displayed on the display device 140.

The deformable sensor 100 therefore not only may detect the presence of contact with the predetermined contact surface, but also the geometry of the predetermined contact surface. In this manner, a robot equipped with a deformable sensor 100 may determine the geometry of an object based on contact with the object. Additionally, a geometry and/or pose of the predetermined contact surface may also be determined based on the geometric information sensed by the deformable sensor 100. For example, a vector 144 that is normal to a surface in the contact region 142 may be displayed, such as when determining the pose of the predetermined contact surface. The vector 144 may be used by a robot or other device to determine which direction a particular predetermined contact surface (i.e., the simulated object) may be oriented, for example.

For calibration operations, the sensed contour as captured by the internal sensor 130 may be compared with the data and/or model of the predetermined contact surface to determine any differences between the known or predetermined contact surface and the sensed contour. The differences may be used to adjust and/or update calibration parameters of the deformable sensor 100, which may include intrinsic parameters and/or extrinsic parameters of the deformable sensor 100 or internal sensor of the deformable sensor 100. In some embodiments, the calibration device 200 may also be utilized to train a machine learning object detection system that utilizes the deformable sensor 100 as a means of sensing the geometry and ultimately making a prediction or determination as to the object in contact with the deformable sensor 100.

Turning now to FIG. 7, example components of one non-limiting embodiment of a calibration system 300 is schematically depicted. The system 300 includes a communication path 320, an electronic control unit 330 having a processor 332 and a memory module 334, a display device 336, a manipulatable robot arm 338, one or more input devices 340, a deformable sensor 100, a calibration device 200, and network interface hardware 350. The various components of the system 300 and the interaction thereof will be described in detail below. It is understood that other embodiments of the system 300 may include additional components.

The communication path 320 may be formed from any medium that is capable of transmitting a signal such as, for example, conductive wires, conductive traces, optical waveguides, or the like. Moreover, the communication path 320 may be formed from a combination of mediums capable of transmitting signals. In one embodiment, the communication path 320 comprises a combination of conductive traces, conductive wires, connectors, and buses that cooperate to permit the transmission of electrical data signals to components such as processors, memories, sensors, input devices, output devices, and communication devices. Accordingly, the communication path 320 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 320 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

The electronic control unit 330 may be any device or combination of components comprising a processor 332 and the memory component 334. The processor 332 of the system 300 may be any device capable of executing the machine-readable instruction set stored in the memory component 334. Accordingly, the processor 332 may be an electric controller, an integrated circuit, a microchip, a field programmable gate array, a computer, or any other computing device. The processor 332 is communicatively coupled to the other components of the system 300 by the communication path 320. Accordingly, the communication path 320 may communicatively couple any number of processors 332 with one another, and allow the components coupled to the communication path 320 to operate in a distributed computing environment. Specifically, each of the components may operate as a node that may send and/or receive data. While the embodiment depicted in FIG. 7 includes a single processor 332, other embodiments may include more than one processor 332.

The memory component 334 of the system 300 is coupled to the communication path 320 and communicatively coupled to the processor 332. The memory component 334 may be a non-transitory computer readable memory and may comprise RAM, ROM, flash memories, hard drives, or any non-transitory memory device capable of storing machine-readable instructions such that the machine-readable instructions can be accessed and executed by the processor 332. The machine-readable instruction set may comprise logic or algorithm(s) written in any programming language of any generation (e.g., 1GL, 2GL, 3GL, 4GL, or 5GL) such as machine language that may be directly executed by the processor 332, or assembly language, object-oriented programming (OOP), scripting languages, microcode, etc., that may be compiled or assembled into machine readable instructions and stored in the memory component 334. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the system 300 depicted in FIG. 7 includes a single memory component 334, other embodiments may include more than one memory components 334.

Still referring to FIG. 7, the system 300 includes a display device 336 for providing a visual output, for example, to project depth data sensed by the internal sensor. The display device 336 is coupled to the communication path 320. Accordingly, the communication path 320 communicatively couples the display device 336 with other modules of the system 300. The display device 336 may include any medium capable of transmitting an optical output such as, for example, a cathode ray tube, light emitting diodes, a liquid crystal display, a plasma display, or the like. Additionally, the display device 336 may be the display device 336 of a portable personal device such as a smart phone, tablet, laptop or other electronic device. Furthermore, the display device 336 may be a television display mounted on a stand or on a wall to project depth data sensed by the internal sensor. Additionally, it is noted that the display device 336 can include one or more processors 332 and one or more memory components 334. While the system 300 includes a display device 336 in the embodiment depicted in FIG. 7, the system 300, may not include a display device 336.

Still referring to FIG. 7, a robotic arm 338, is coupled to the communication path 320 and communicatively coupled to the electronic control unit 330. The robotic arm 338 may comprise multiple mechanical segments linked together by servos, actuators or other types of joint forming a kinematic chain. One end of the robotic arm 338 may include an end effector for collecting items. The end effector may comprise a deformable sensor 100. An opposing end of the robotic arm 338 may be mounted to a robot or housing (not shown). The electronic control unit 330 which is communicatively coupled to the robotic arm 338 provides commands in the form of signals to the robotic arm 338 to manipulate its movement. For example, the electronic control unit 330 using image data from the one or more cameras may provide signals to the robotic arm 338 to navigate the end effector proximate an item, collect the item and then navigate the robotic arm 338 and end effector proximate a location in the holding container for placing the item. The robotic arm 338 is intended to simulate similar actions to that of a human arm and hand preforming similar activities.

Still referring to FIG. 7, one or more input devices 340 are coupled to the communication path 320 and communicatively coupled to the processor 332. The input device 340 may be any device capable of transforming user contact into a data signal that can be transmitted over the communication path 320 such as, for example, a button, a switch, a knob, a microphone or the like. In various embodiments an input device 340 may be a deformable sensor 100 and/or an internal sensor 130 as described above. In some embodiments, the input device 340 includes a power button, a volume button, an activation button, a scroll button, or the like. The one or more input devices 340 may be provided so that the user may interact with the system 300, such as to navigate menus, make selections, set preferences, and other functionality described herein. In some embodiments, the input device 340 includes a pressure sensor, a touch-sensitive region, a pressure strip, or the like. It should be understood that some embodiments may not include the input device 340. In some embodiments, one or more of the input devices 340 are configured as a fingerprint sensor for unlocking the system 300. For example, only a user with a registered fingerprint may unlock and use the system 300.

The network interface hardware 350 is coupled to the communication path 320 and communicatively coupled to the processor 332. The network interface hardware 350 may be any device capable of transmitting and/or receiving data via a network 370. Accordingly, network interface hardware 350 can include a wireless communication module configured as a communication transceiver for sending and/or receiving any wired or wireless communication. For example, the network interface hardware 350 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 350 includes hardware configured to operate in accordance with the Bluetooth wireless communication protocol. In another embodiment, network interface hardware 350 may include a Bluetooth send/receive module for sending and receiving Bluetooth communications to/from a portable electronic device 380. The network interface hardware 350 may also include a radio frequency identification ("RFID") reader configured to interrogate and read RFID tags.

In some embodiments, the system 300 may be communicatively coupled to a portable electronic device 380 via the network 370. In some embodiments, the network 370 is a personal area network that utilizes Bluetooth technology to communicatively couple the system 300 and the portable electronic device 380. In other embodiments, the network 370 may include one or more computer networks (e.g., a personal area network, a local area network, or a wide area network), cellular networks, satellite networks and/or a global positioning system and combinations thereof. Accordingly, the system 300 can be communicatively coupled to the network 370 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 7, as stated above, the network 370 may be utilized to communicatively couple the system 300 with the portable electronic device 380. The portable electronic device 380 may include a mobile phone, a smartphone, a personal digital assistant, a camera, a dedicated mobile media player, a mobile personal computer, a laptop computer, and/or any other portable electronic device capable of being communicatively coupled with the system 300. The portable electronic device 380 may include one or more processors and one or more memories. The one or more processors can execute logic to communicate with the system 300. The portable electronic device 380 may be configured with wired and/or wireless communication functionality for communicating with the system 300. In some embodiments, the portable electronic device 380 may perform one or more elements of the functionality described herein, such as in embodiments in which the functionality described herein is distributed between the system 300 and the portable electronic device 380.

Figure 8:
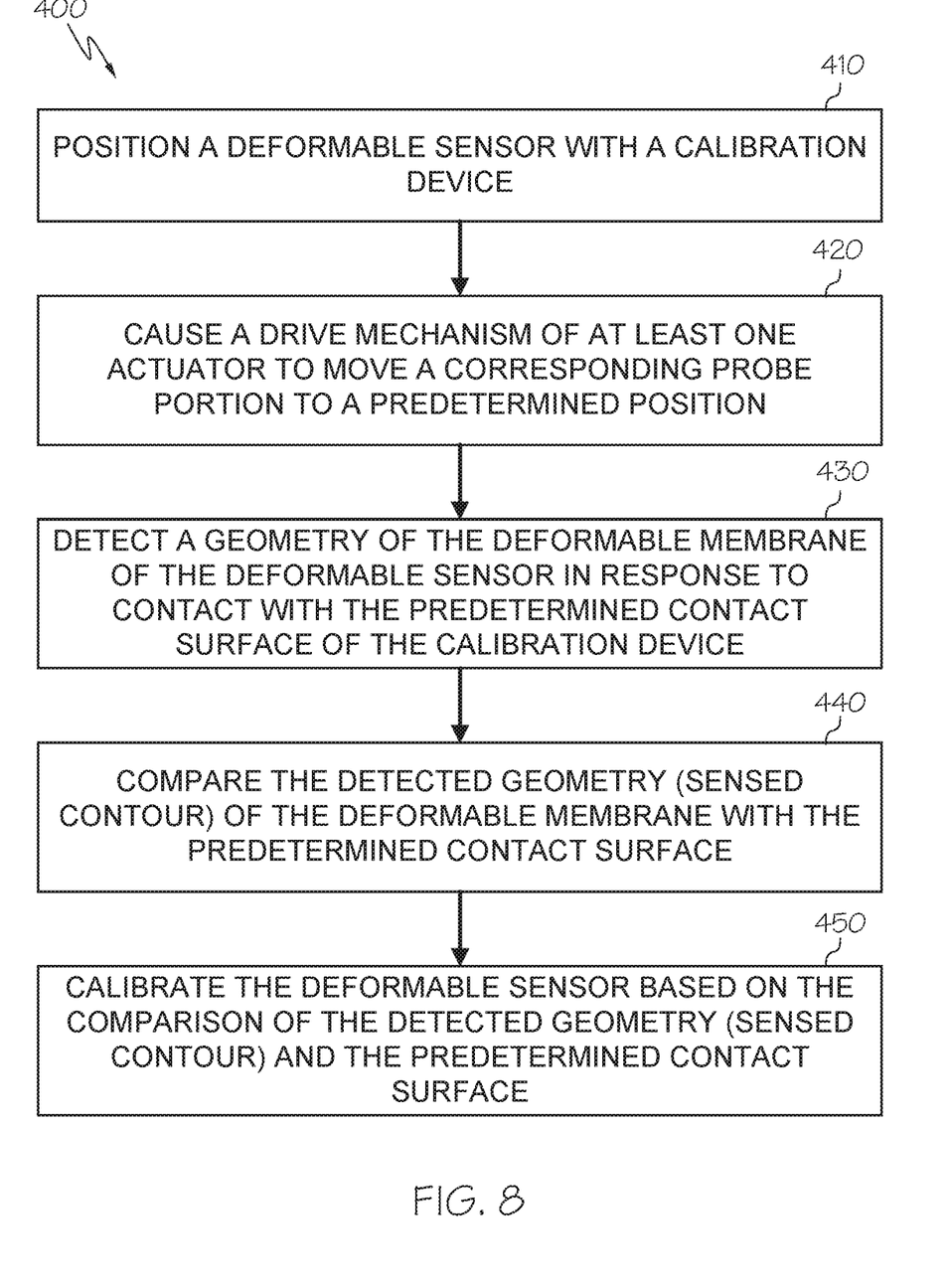
FIG. 8 is a flow chart depicting an exemplary process of calibrating a deformable sensor with the calibration device according to one or more embodiments described and illustrated herein.

Turning now to FIG. 8, a flowchart 400 illustrates an exemplary process for calibrating a deformable sensor 100 with a calibration device 200 as disclosed herein. The following process will be described with reference to a robot arm and an electronic control unit 330. However, this is only an example and it should be understood that the process may be implemented by various devices without deviating from the present disclosure. At block 410, for example, an electronic control unit 330 may be configured to cause a robotic arm 338 to position a deformable sensor 100 with a calibration device 200. At block 420, the electronic control unit 330 may cause a drive mechanism 205 of at least one actuator 201 to move a corresponding probe portion 210 to a predetermined position. The electronic control unit 330 may transmit one or more control signals to the drive mechanism 205 of the actuator 201 that causes the probe portion 210 to extend from or retract toward the drive mechanism 205. In some embodiments, the electronic control unit 330 determine the present position of the probe portion 210 of the actuator 201 such that the control signal provided to the drive mechanism causes the probe portion to move to the predetermined position relative its present position. At block 430, the electronic control unit 330 may determine a geometry of the deformable membrane 120 of the deformable sensor 100. For example, the electronic control unit 330 may receive sensor data from an internal sensor of the deformable sensor 100 that includes depth (time-of-flight) data corresponding to the contour of the internal surface of the deformable membrane 120. This contour is referred to the "sensed contour" herein. At block 440, the electronic control unit 330 executes a compare operation where the sensed contour of the deformable membrane 120 is compared with the predetermined contact surface of the calibration device 200. Calibration of the deformable sensor 100 is then carried out at block 450 based on differences determined from the comparison of the sensed contour and the predetermined contact surface. Calibration may include adjusting one or more intrinsic parameters and/or extrinsic parameters of the deformable sensor 100 and/or the internal sensor 130 of the deformable sensor 100.

For example, time of flight parameters for the internal sensor may be adjusted if it is determined that the deformable membrane 120 deformed more or less that it should in response to the predetermined contact surface. This is only one example and other parameters for calibration may readily be apparent to those skilled in the art.

It should be understood that steps of the aforementioned process may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that embodiments of the present disclosure are directed calibration devices, systems, and methods. The calibration device may include a frame, at least one actuator supported by the frame, wherein the at least one actuator comprises a drive mechanism operatively coupled to a probe portion, and an electronic control unit communicatively coupled to the drive mechanism of the at least one actuator. The electronic control unit is configured to cause the drive mechanism to move the probe portion a predetermined position to form a predetermined contact surface defined by an end of the probe portion of the actuator.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A calibration device for calibrating a deformable sensor comprising:
    a frame;
    at least one actuator supported by the frame, wherein the at least one actuator comprises a drive mechanism operatively coupled to a probe portion;
    one or more locating features configured to align with a corresponding locating feature of the deformable sensor when the deformable sensor is aligned for calibration with the calibration device; and
    an electronic control unit communicatively coupled to the drive mechanism of the at least one actuator, wherein the electronic control unit is configured to:
        cause the drive mechanism to move the probe portion to a predetermined position to form a predetermined contact surface defined by an end of the probe portion of the at least one actuator.

2. The calibration device of claim 1, wherein the frame comprises an array of actuators.

3. The calibration device of claim 2, wherein the electronic control unit is configured to:
    cause a plurality of selected actuators of the array of actuators to move corresponding probe portions to predetermined positions to form the predetermined contact surface defined by ends of the probe portions of the array of actuators.

4. The calibration device of claim 3, wherein the predetermined contact surface defined by ends of the probe portions of the array of actuators causes a deformable membrane of the deformable sensor to conform with the predetermined contact surface when brought into contact with the deformable sensor.

5. The calibration device of claim 1, wherein the at least one actuator is an electromechanical actuator, wherein the drive mechanism includes a motor configured to receive control signals from the electronic control unit.

6. A system for calibrating a deformable sensor with a calibration device, the system comprising:
    a deformable sensor comprising a deformable membrane configured to deform when in contact with an object and an internal sensor configured to output depth values for a region of the deformable membrane defining a deformation of the deformable membrane caused by contact with the object;
    a calibration device comprising a frame and at least one actuator comprising a drive mechanism operatively coupled to a probe portion; and
    an electronic control unit communicatively coupled to the deformable sensor and the drive mechanism of the at least one actuator, wherein the electronic control unit is configured to:
        cause the drive mechanism to move the probe portion of at least one actuator to a predetermined position to form a predetermined contact surface defined by an end of the probe portion of the at least one actuator;
        receive depth values from the internal sensor of the deformable sensor, wherein the depth values define a sensed contour of a surface of the deformable membrane in contact with the predetermined contact surface defined by the calibration device;
        compare the sensed contour of the surface of the deformable membrane and the predetermined contact surface; and
        calibrate the deformable sensor based on differences determined from the comparison of the sensed contour of the surface of the deformable membrane and the predetermined contact surface.

7. The system of claim 6, wherein the deformable sensor further comprises:
    an enclosure comprising a housing and the deformable membrane coupled to an upper portion of the housing, the enclosure configured to be filled with a medium; and
    the internal sensor, disposed within the enclosure, having a field of view configured to be directed through the medium and toward a bottom surface of the deformable membrane.

8. The system of claim 6, wherein the frame of the calibration device comprises an array of actuators.

9. The system of claim 8, wherein the electronic control unit is configured to:
    cause a plurality of selected actuators of the array of actuators to move corresponding probe portions to predetermined positions to form the predetermined contact surface defined by ends of the probe portions of the array of actuators.

10. The system of claim 9, wherein the predetermined contact surface defined by ends of the probe portions of the array of actuators causes the deformable membrane of the deformable sensor to conform with the predetermined contact surface when brought into contact with the deformable sensor.

11. The system of claim 6, wherein the at least one actuator is an electromechanical actuator, wherein the drive mechanism includes a motor configured to receive control signals from the electronic control unit.

12. The system of claim 6, wherein the electronic control unit is configured to adjust an intrinsic or an extrinsic parameter of an internal sensor.

13. The system of claim 6, wherein the internal sensor comprises a time of flight sensor.

14. The system of claim 6, further comprising a robot arm, wherein the deformable sensor is coupled to one end of the robot arm and the electronic control unit is further configured to manipulate the robot arm to align the deformable sensor with the calibration device for calibration of the deformable sensor.

15. A method of calibrating a deformable sensor with a calibration device, the method comprising:
- positioning an array of actuators of the calibration device adjacent to a deformable membrane of the deformable sensor;
- causing selected actuators of the array of actuators to move to corresponding probe portions to a predetermined position wherein ends of the probe portions of the array of actuators define a predetermined contact surface and displace the deformable membrane according to the predetermined contact surface;
- detecting, with the deformable sensor, a geometry of the deformable membrane of the deformable sensor in response to contact with the predetermined contact surface of the calibration device;
- comparing, with an electronic control unit, the detected geometry and the predetermined contact surface; and
- calibrating the deformable sensor based on the comparison of the detected geometry and the predetermined contact surface.

16. The method of claim 15, wherein calibrating the deformable sensor further comprises adjusting an intrinsic or an extrinsic parameter of an internal sensor disposed within the deformable sensor, the internal sensor is configured to sense depth changes of the deformable membrane.

17. The method of claim 15, wherein calibrating the deformable sensor includes adjusting a time-of-flight parameter of an internal sensor configured to output depths values based on time-of-flight measurements.

18. The method of claim 15, wherein positioning the array of actuators of the calibration device adjacent to the deformable membrane of the deformable sensor further includes aligning a locating feature of the calibration device with a corresponding locating feature of the deformable sensor.

19. The method of claim 15, further comprising determining a present position of a probe portion of an actuator prior to causing selected actuators of the array of actuators to move to the corresponding probe portions to the predetermined position, such that a control signal configured to cause movement of the probe portion to the predetermined position is a control signal that causes movement relative to the present position of the probe portion.

* * * * *